(No Model.)
J. SNOW.
BELT FASTENER.
No. 394,412. Patented Dec. 11, 1888.
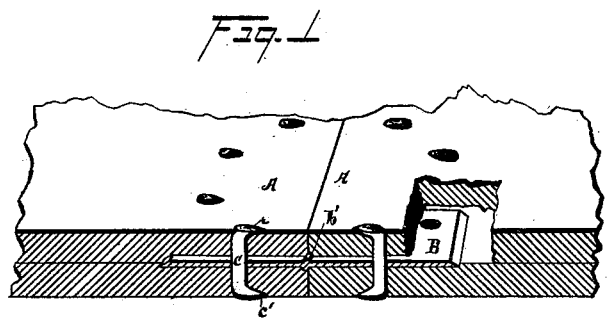
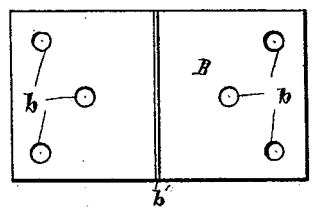
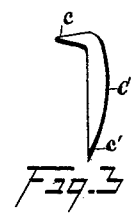
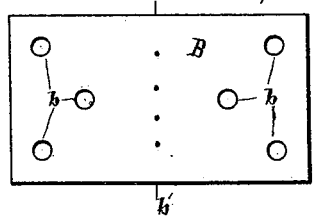
WITNESSES.
B. S. Lowrie.
Geo. W. King
James Snow. INVENTOR,
By
Liggett & Liggett
Attorneys.

UNITED STATES PATENT OFFICE.

JAMES SNOW, OF CLEVELAND, OHIO, ASSIGNOR TO WILLIAM H. H. PECK AND SARAH E. SNOW, BOTH OF SAME PLACE.

BELT-FASTENER.

SPECIFICATION forming part of Letters Patent No. 394,412, dated December 11, 1888.

Application filed April 21, 1888. Serial No. 271,399. (No model.)

*To all whom it may concern:*

Be it known that I, JAMES SNOW, of Cleveland, in the county of Cuyahoga and State of Ohio, have invented certain new and useful Improvements in Belt-Fasteners; and I do hereby declare the following to be a full, clear, and exact description of the invention, such as will enable others skilled in the art to which it pertains to make and use the same.

My invention relates to improvements in belt-fasteners, designed more especially for heavy belts that are used with "tighteners" in which the two ends of the belt abut each other and are connected by means of one or more coupling-plates inserted between the layers of the belt, such plates having holes near the ends thereof and the plates and belt ends being riveted through and through, to the end that the belt is not materially increased in thickness at the splice and that the two sides of the belt present uniform even surfaces for engaging the pulleys.

My invention also relates to a peculiar form of rivet adapted to the purpose.

In the accompanying drawings, Figure 1 is a view in perspective showing a belt-splice embodying my invention, portions being broken away to show the construction. Figs. 2 and 5 are plans of the coupling-plate employed. Figs. 3 and 4 are elevations of a rivet taken at right angles to each other.

My improved coupling is not applicable to single belts—that is, belts of one layer of material—but is only used with heavy belts of two or more plies or layers of material, such as are commonly used for driving-belts and for heavy work generally.

A A represent the two ends of the belt, that are cut square and abutted together, as shown in Fig. 1. Between the layers of the belts are inserted the coupling-plates B. These plates are usually from an inch and a half to two inches in length and from an inch to an inch and a half (more or less) in width, and any number of such plates may be used in making the splice, according to the width of the belt, such plates being arranged side by side and in close proximity to each other. The adjacent plates may touch each other or may be slightly separated, as may be necessary in filling out the width of the belt, with a given number of plates at hand, without the plate protruding beyond the edges of the belt. By using a number of narrow plates the belt is left flexible crosswise, and can therefore conform to the face—for instance, of a crowning-pulley—so that the entire width of the belt will hug the pulley and thereby be utilized in transmitting power.

Plates B are preferably of very thin plate-spring steel, each plate having a series of holes, $b$, near the ends thereof (see Figs. 2 and 5) for receiving rivets C. The transverse central line, $b'$, of each plate is marked, for convenience, in placing these plates centrally with the abutting-line of the belt end, and to this end slight depressions—such as may be made by a prick-punch—may be made in these plates at the same operation with the punching of the holes and cutting the plates to size. Any other suitable mark will answer the purpose, and if, for instance, malleable cast-iron plates are used for the purpose slight depressions or ribs, as shown at $b'$, Figs. 1 and 2, may be used for marking the central line of the plate.

The rivets C are preferably made of round wire cut to lengths and flatted or beveled off at the two ends and on the same side to points, the one end being bent at substantially a right angle to the body of the rivet to form a hook or head, $c$, the flatted side of such hook or head being on top or outside the head. The rivets are driven through the belt and, respectively, through holes $b$ of the coupling-plate, and are then clinched by turning the protruding ends in the same direction as the head $c$, the two ends presenting toward the splice, as shown in Fig. 1. The rivets are hammered down until the hooks or heads thereof are flush with and preferably a trifle below the surface of the belt, in which latter case the rivets do not engage the pulleys. The peculiar advantages of this rivet are that the under side of the head presents rounded surfaces to the belt, and consequently does not cut or break the fiber of the belt in riveting, and when riveted the heads present flat surfaces on the outside; also, in driving in the rivets the rounded chiseled points thereof cut a smooth hole in the belt without breaking or tearing the fiber, and, the initial cut being small, the rounded body of the rivet crowds back the fiber of the belt, leaving the latter packed firmly around the rivet; also, the draft of the belt on the rivets is entirely against rounded surfaces of the rivets. These rivets are cheaply made by severing round wire on diagonal lines, and at the same operation, by means of suitable heading-dies, bending the one end to form the hook or head c. I do not, however, wish to limit myself to this manner of making the rivets.

Plates B, when made of thin plate-steel, do not materially increase the thickness of the belt at the splice. In fact, when the splice is completed, the coupling-plates being firmly embedded in the belt by the draft of the rivets, the extra thickness at the splice is hardly perceptible, and such splice runs as smoothly and noiselessly over the pulley as other parts of the belt, and the same uniform surface is had on either side of the belt for engaging the pulley. In case the belt requires "taking up" the rivets may be punched out on the one side of the splice, leaving the other side of the splice intact. The rivets may be punched out without injury to the belt, and the holes would usually be cut off in shortening the belt. A splice made in this manner is likely to last as long as any other part of the belt, and may be made with comparatively little trouble or expense.

What I claim is—

1. In belt-coupling, a rivet having a body substantially round in cross-section, the end portions of such rivet being beveled on the same side to points at the ends, the one end thereof extending substantially at right angles to the body of the rivet to form a head or hook, with the flatted side of such head or hook on the outside, substantially as set forth.

2. In belt-coupling, the combination, with belt and coupling-plate inserted between the layers of the belt, substantially as indicated, of rivets, substantially as described, said rivets extending through the belt and through the holes of the coupling-plate, each rivet being flatted or beveled on the same side to points at the ends, and the pointed ends being turned toward the splice with the flatted surfaces thereof outermost, substantially as set forth.

In testimony whereof I sign this specification, in the presence of two witnesses, this 7th day of January, 1888.

JAMES SNOW.

Witnesses:
 CHAS. H. DORER,
 ALBERT E. LYNCH.